(12) United States Patent
Kitagawa et al.

(10) Patent No.: US 7,219,759 B2
(45) Date of Patent: May 22, 2007

(54) MANUAL OPERATION DEVICE FOR OPERATING IN-VEHICLE APPARATUS

(75) Inventors: Nozomi Kitagawa, Okazaki (JP); Yuji Ito, Okazaki (JP)

(73) Assignee: DENSO Corporation, Kariya (JP)

( * ) Notice: Subject to any disclaimer, the term of this patent is extended or adjusted under 35 U.S.C. 154(b) by 27 days.

(21) Appl. No.: 10/770,596

(22) Filed: Feb. 3, 2004

(65) Prior Publication Data
US 2004/0154848 A1 Aug. 12, 2004

(30) Foreign Application Priority Data
Feb. 4, 2003 (JP) ............................. 2003-027022
Dec. 3, 2003 (JP) ............................. 2003-404757

(51) Int. Cl.
*G06F 7/00* (2006.01)
(52) U.S. Cl. ...................... 180/168; 180/169; 180/170
(58) Field of Classification Search ................ 180/168, 180/169, 170
See application file for complete search history.

(56) References Cited

U.S. PATENT DOCUMENTS

| 4,298,280 A | * | 11/1981 | Harney ...................... 356/5.06 |
| 5,128,669 A | * | 7/1992 | Dadds et al. ................ 340/901 |
| 6,405,132 B1 | * | 6/2002 | Breed et al. ................. 701/301 |
| 6,591,175 B2 | * | 7/2003 | Numata et al. ................ 701/36 |
| 6,801,138 B2 | * | 10/2004 | Koike ......................... 340/902 |
| 6,850,838 B2 | * | 2/2005 | Morita ........................ 701/207 |
| 6,919,866 B2 | * | 7/2005 | Kanevsky et al. ............. 345/8 |
| 6,924,736 B2 | * | 8/2005 | Oexmann et al. ........... 340/436 |
| 6,931,233 B1 | * | 8/2005 | Tso et al. ................... 455/12.1 |

* cited by examiner

*Primary Examiner*—Christopher P. Ellis
*Assistant Examiner*—Cynthia F. Collado
(74) *Attorney, Agent, or Firm*—Harness, Dickey & Pierce, PLC (57) ABSTRACT

An operation member is manually operable to select and drive an in-vehicle apparatus. A compression spring applies counterforce to the operation member against operational movement of the operation member. A load sensor senses an operational work load of a driver of a vehicle. A movable member is driven by a motor to change the counterforce based on the operational work load of the driver sensed by the load sensor.

11 Claims, 9 Drawing Sheets

VEHICLE SPEED

FIG. 3B

VEHICLE SPEED

MANUAL OPERATION DEVICE FOR OPERATING IN-VEHICLE APPARATUS

CROSS REFERENCE TO RELATED APPLICATION

This application is based on and incorporates herein by reference Japanese Patent Application No. 2003-27022 filed on Feb. 4, 2003 and Japanese Patent Application No. 2003-404757 filed on Dec. 3, 2003.

BACKGROUND OF THE INVENTION

1. Field of the Invention

The present invention relates to a manual operation device for operating an in-vehicle apparatus.

2. Description of Related Art

In general, a vehicle includes various in-vehicle apparatuses, such as an air conditioning apparatus, an audio apparatus, a navigation apparatus. For example, the air conditioning apparatus has various operational modes, such as a foot mode, a face mode, a defroster mode. A driver of the vehicle manually operates a lever, a knob or a button to select one of the operational modes. The selection of the operational mode is generally performed by moving (sliding) the lever, rotating the knob or depressing the button.

Figure 12:
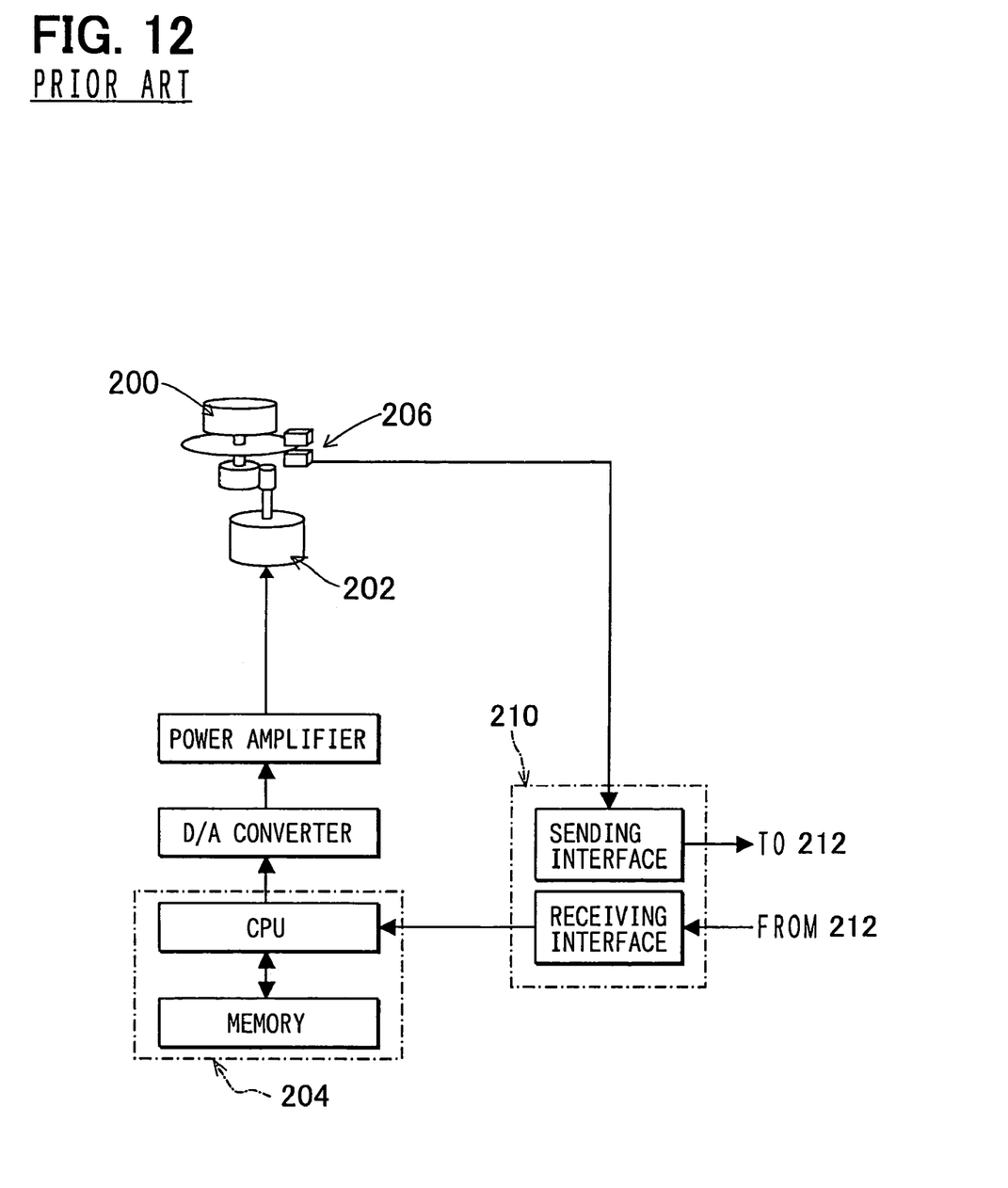
FIG. 12 is a schematic view showing a prior art device.

Various attempts have been made to improve operational feeling of the lever, the knob or the button. For example, as shown in FIG. 12, a manual operation device recited in Japanese Unexamined Patent Publication No. 2002-189557 (corresponding to U.S. Pat. No. 6,591,175) includes an operation member 200, an actuator 202, a control arrangement 204, a sensing member 206 and an input/output member 210. The actuator 202 applies external force to the operation member 200. The control arrangement 204 controls operation of the actuator 202. The sensing member 206 senses an operational state of the operation member 202. The input/output member 210 communicates signals with an in-vehicle apparatus (i.e., a vehicle mounted apparatus) 212 installed in the vehicle. An external signal of a sensing means (not shown), which is connected to the in-vehicle apparatus 212, is inputted to the control arrangement 204. Then, the control arrangement 204 generates a corresponding predetermined control signal. Operation of the actuator 202 is controlled based on the control signal.

The manual operation device recited in Japanese Unexamined Patent Publication No. 2002-189557 is intended to provide different operational feelings through the operation member 200 based on a state of the in-vehicle apparatus 212. For example, when drive force for driving the operation member 200 needs to be changed, the amount of the driving force, an applying direction of the driving force and a load applying time period are taken into account.

However, an operational work load of the driver is not taken into account in the manual operation device recited in Japanese Unexamined Patent Publication No. 2002-189557. In a parked state of the vehicle, when the driver operates the operation member 200, the driver can concentrate on the operation of the operation member 200. Thus, it is desirable to operate the operation member 200 with a relatively small drive force in the parked state of the vehicle. Contrary to this, in a driving state of the vehicle, the driver needs to concentrate on maneuvering of the vehicle and thus can only provide small attention to the operation of the operation member 200. Thus, when the operation member 200 can be operated with the relatively small drive force in the driving state of the vehicle, the driver may not notice activation of the operation member 200. This might cause inadvertent incorrect operation of the operation member 200. In order to prevent the inadvertent incorrect operation of the operation member 200, it is desirable to make the operation member 200 only operable with a relatively large drive force in the driving state of the vehicle.

SUMMARY OF THE INVENTION

The present invention addresses the above disadvantage. Thus, it is an objective of the present invention to provide a manual operation device, which is provided to operate an in-vehicle apparatus and is operable while providing appropriate operational feeling based on the amount of operational work load of a driver of a vehicle.

To achieve the objective of the present invention, there is provided a manual operation device for operating at least one in-vehicle apparatus installed in a vehicle. The manual operation device includes an operation member, a counterforce applying means, a load sensing means, and a counterforce changing means. The operation member is manually operable in at least one predetermined direction to select and drive at least one of the at least one in-vehicle apparatus. The counterforce applying means is for applying counterforce to the operation member against operational movement of the operation member. The load sensing means is for sensing an operational work load of a driver of the vehicle. The counterforce changing means is for changing the counterforce based on the operational work load of the driver sensed by the load sensing means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference to the accompanying drawings.

Figure 1:
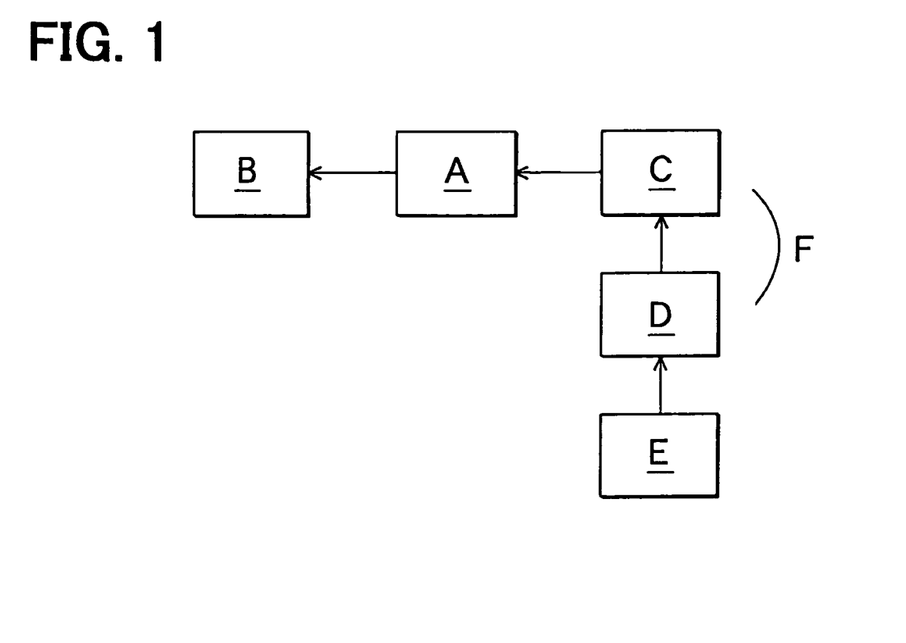
FIG. 1 is a schematic view showing a structure of a manual operation device of the present invention.

FIG. 1 shows a basic arrangement of the present invention. A manual operation member A is manually operated by a driver of a vehicle to operate an in-vehicle apparatus (vehicle mounted apparatus) B installed in the vehicle. Counterforce is applied from a counterforce applying means C to the operation member A against operational movement of the operation member A operated by the driver. Operational work load of the driver is sensed by a load sensing means E. Based on an input supplied from the sensing means E, a counterforce changing means D changes the counterforce applied from the counterforce applying means C to the manual operation member A. The counterforce applying means C and the counterforce changing means D constitute a control means F.

The manual operation member and the in-vehicle apparatuses will be described in greater detail. The manual operation member can be, for example, a slide lever, a rotatable knob, a depressable button, a joy-stick or a drag ball, which is operated by the driver or another passenger. The in-vehicle apparatus can be, for example, an air conditioning apparatus, an audio apparatus, a cruise control (CC) apparatus, a navigation apparatus or a road selecting member.

When the operational work load of the driver is relatively small, the counterforce applying means and the counterforce changing means are desirably operated to provide the counterforce in such a manner that the manual operation member is operable with a relatively small drive force. Contrary to this, when the operational work load of the driver is relatively large, the counterforce applying means and the counterforce changing means are desirably operated to provide the counterforce in such a manner that the manual operation member is operable only with a relatively large drive force. Furthermore, it is desirable that the manual operation member provides click feeling to the driver at the time of operating the manual operation member, so that the driver can advantageously sense the operational state of the manual operation member through his/her fingers upon receiving the click feeling from the manual operation member.

Upon operation of the single manual operation member, it is possible to operate only one in-vehicle apparatus or alternatively to selectively operate one selected from the in-vehicle apparatuses. Further alternatively, multiple manual operation members can be provided to operate multiple in-vehicle apparatuses.

Next, the operational work load of the driver will be described in greater detail. In the present invention, the operational work load of the driver can be physical work load (physical work burden) and/or mental work load (mental work burden) applied to the driver during maneuvering of the vehicle. More specifically, the operational work load of the driver can be expressed in terms of, for example, a vehicle speed (e.g., high speed, low speed), a vehicle-to-vehicle distance (e.g., long distance, short distance) between two vehicles, an operational state (e.g., on-state or off-state) of the cruise control apparatus (an apparatus for driving the vehicle at a constant speed), a type of a subject road (e.g., motor road or non-motor road) where the vehicle is traveling. Throughout the specification, it should be noted that the motor road is defined a road dedicated to automobiles. Also, the non-motor road is a road other than the motor road.

Figure 2A:
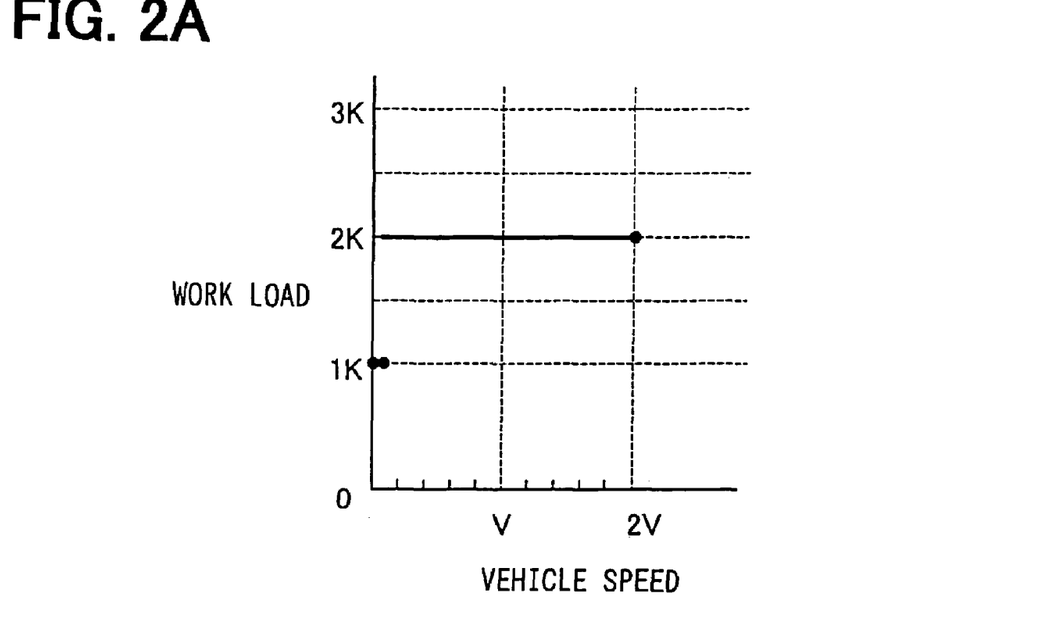
FIG. 2A is a graph showing a relationship between an operational work load of a driver and the vehicle speed, illustrating one case.
Figure 2B:
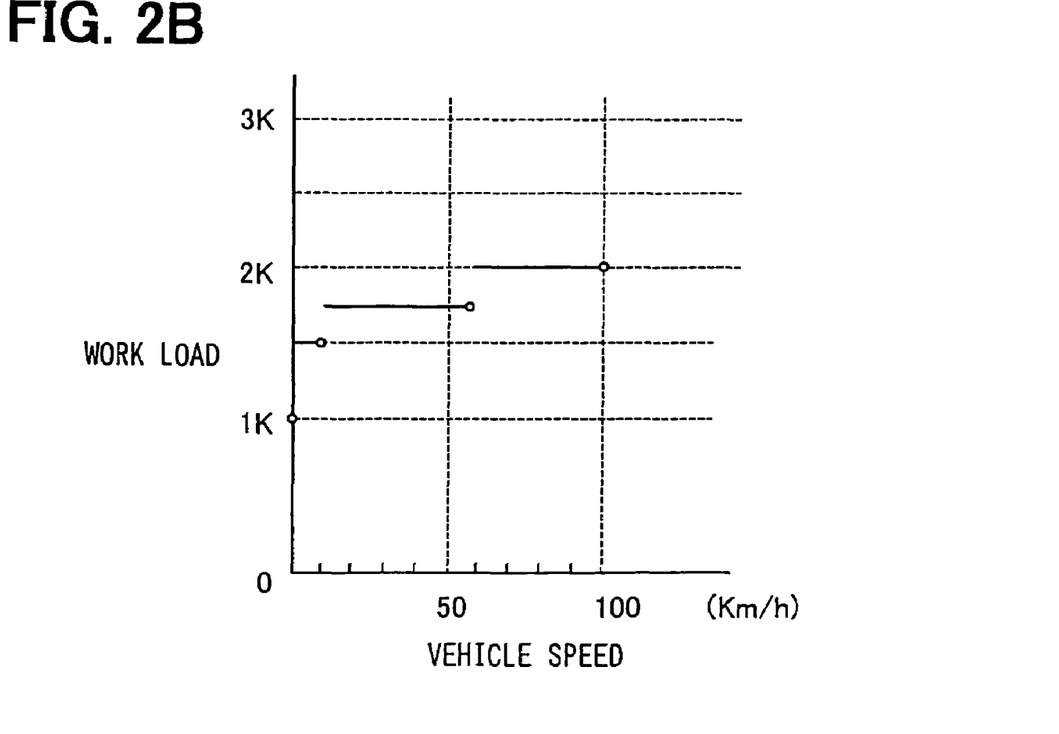
FIG. 2B is a graph showing a relationship between an operational work load of the driver and the vehicle speed, illustrating another case.

Now, the vehicle speed will be described in greater detail. When the vehicle is in a stopped state (parked state), the operational work load of the driver is relatively small. However, when the vehicle is in a driving state, the operational work load of the driver is relatively large. Furthermore, even in the driving state of the vehicle, when the vehicle is driven at a relatively low speed, the operational work load of the driver is relatively small. However, when the vehicle is driven at a relatively high speed, the operational work load of the driver is relatively large. The vehicle speed is sensed by a vehicle speed sensor. The operational work load of the driver can be classified into two or more classes based on the vehicle speed. The classified operational work load of the driver is then inputted to the counterforce changing means. For example, with reference to FIG. 2A, when the vehicle speed is zero, the operational work load of the driver can be indicated as "1K". When the vehicle speed is other than zero, i.e., when the vehicle is driven at a speed equal to or less than a vehicle speed 2v, the operational work load of the driver can be indicated as "2K". In another example, as shown in FIG. 2B, when the vehicle speed is zero, the operational work load of the driver can be indicated as "1K". When the vehicle speed is greater than zero but is equal to or less than 10 km/h, the operational work load of the driver can be indicated as "1.5K". Furthermore, when the vehicle speed is 10–60 km (i.e., greater than 10 km but is equal to or less than 60 km), the operational work load of the driver can be indicated as "1.75K". When the vehicle speed is greater than 60 km/h but is equal to or less than 100 km/h, the operational work load of the driver can be indicated as "2K".

Next, the vehicle-to-vehicle distance will be described in greater detail. The vehicle-to-vehicle distance includes a distance between his/her own vehicle (subject vehicle) and a front vehicle located in front of the own vehicle and also a distance between the own vehicle and a left side vehicle located on the left side of the own vehicle or a right side vehicle located on the right side of the own vehicle. When the vehicle-to-vehicle distance is relatively large, the operational work load of the driver is relatively small, so that the driver can concentrate on the operation of the manual operation member. On the other hand, when the vehicle-to-vehicle distance is relatively small, the operational work load of the driver is relatively large, so that the concentration of the driver on the operation of the manual operation member is reduced.

The vehicle-to-vehicle distance is measured by an infrared sensor or a sensor that uses millimetric waves. The operational work load of the driver can be classified into two or more classes based on the vehicle-to-vehicle distance, and the classified operational work load of the driver is then inputted to the counterforce changing means. For example, when the vehicle-to-vehicle distance is infinite (i.e., no vehicle present in front of the own vehicle, for example, within a visible range of the driver) at a predetermined vehicle speed (low speed), the operational work load of the driver can be set as a first predetermined value. The vehicle-to-vehicle distance can be expressed in terms of headway time. When the headway time is equal to first predetermined headway time, the operational work load of the driver can be set as a second predetermined value, which is greater than the first predetermined value. When the headway time is equal to second predetermined headway time, which is shorter than the first headway time, the operational work load of the driver can be set as a third predetermined value, which is greater than the second predetermined value.

The above relationships can be changed as the vehicle speed changes from the low speed to the intermediate speed and then to the high speed. Details will be described in the following embodiments.

Next, the operational state (e.g., on-state, off-state) of the cruise control apparatus will be described in greater detail. The cruise control (CC) apparatus is used to drive the vehicle at a constant speed. When the driver turns on a corresponding switch of the cruise control apparatus, cruise control of the vehicle is performed. When the cruise control apparatus is turned on, the operational work load of the driver is reduced in comparison to the time in which the cruise control apparatus is turned off.

Next, the road type will be described in greater detail. In a highway (motor road that is dedicated to automobiles), due to a wide visible range, absence of traffic signals and a small number of curves, the operational work load of the driver is relatively small. Contrary to this, in an ordinary road (non-motor road), due to a small visible range caused by presence of buildings, needs for frequent stops and stars, for example, at traffic signals and a large number of curves at traffic junctions, the operational work load of the driver is relatively large.

Next, the counterforce, the counterforce applying means and the counterforce changing means will be described in greater detail. In the present invention, the counter force is a brake force, which is applied in a counter direction, which is opposite from an operating direction of the manual operation member, to limit or resist operation (e.g., slide, rotation or depression) of the manual operation member in the operating direction. At the time of operating the manual operation member, an appropriate counterforce applied from the manual operation member to a hand of the driver can improve operational feeling of the driver in comparison to a case where the manual operation member can be pressed with only a little force, i.e., a case where only a little counterforce is applied from the manual operation member to the hand of the driver. The best drive force to drive the manual operation member varies depending on the operational work load of the driver.

The counterforce applying means provides mechanical counterforce or electrical counterforce to the manual operation member operated by the driver. The counterforce changing means changes the amount of the counterforce provided to the manual operation member. For example, a compression spring, which urges the depressable button, can be used as the counterforce applying means, and a movable member, which adjusts the amount of compression of the compression spring, can be used as the counterforce changing means. Alternatively, a motor, which provides a variable drive force that is changed according to the amount of electric current applied to the motor, can be used as the counterforce applying means and the counterforce changing means of the rotatable knob.

Figure 3A:
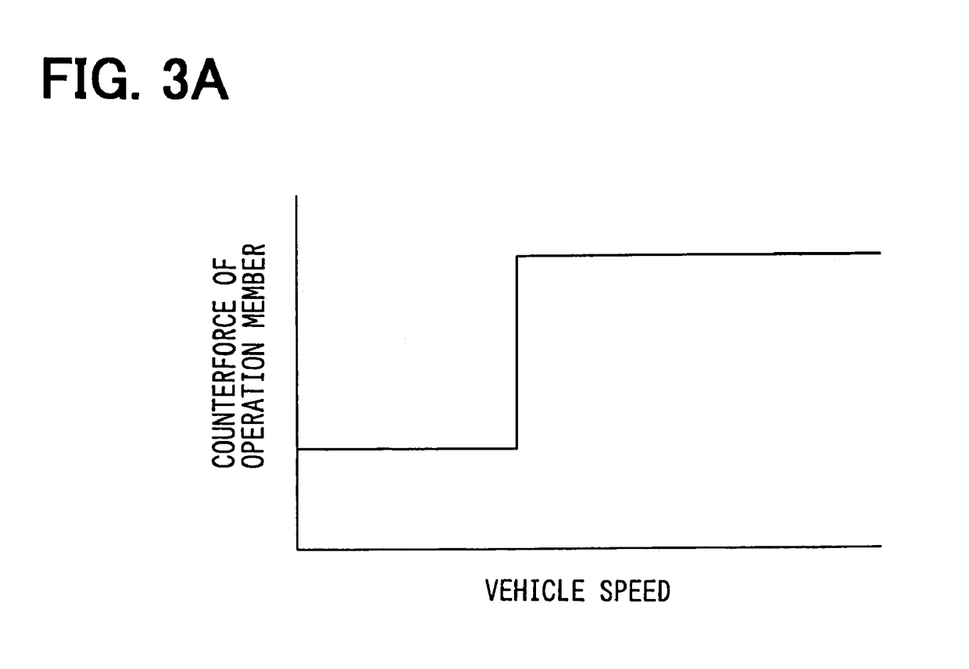
FIG. 3A is a graph showing a relationship between an amount of counterforce of a manual operation member and the vehicle speed, illustrating one case.
Figure 3B:
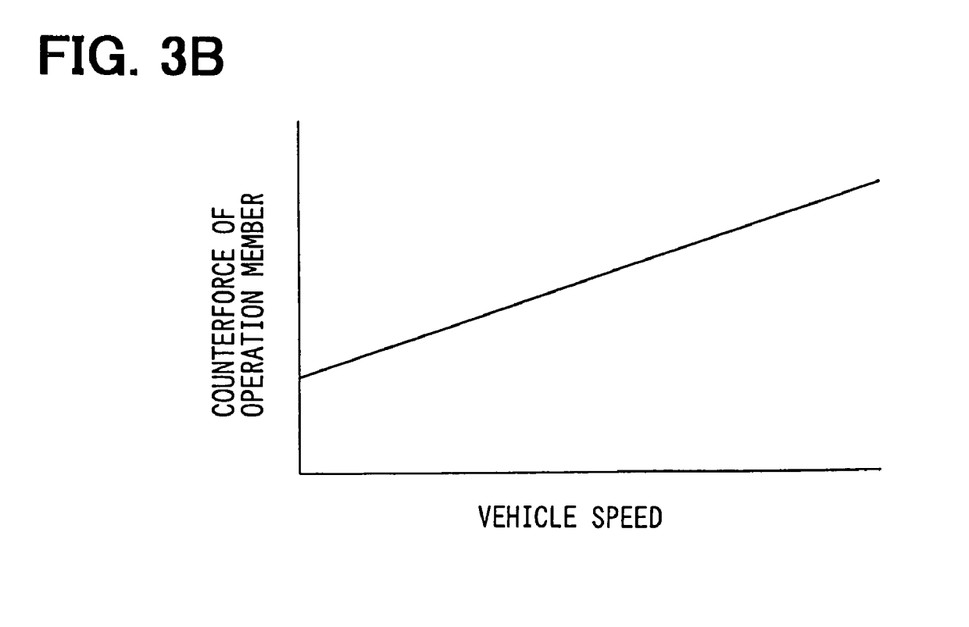
FIG. 3B is a graph showing a relationship between an amount of counterforce of the manual operation member and the vehicle speed, illustrating another case.

According to the vehicle speed and the vehicle-to-vehicle distance, the counterforce changing means may change the amount of the counterforce, which is applied to the manual operational member against operational movement of the manual operation member. For example, as shown in FIG. 3A, the counterforce can be classified into two classes based on the vehicle speed. More specifically, when the vehicle speed is relatively low, the counterforce can be relatively small. When the vehicle speed is relatively high, the counterforce can be relatively large. In this case, the counterforce is applied in a stepwise manner. Thus, when the vehicle speed is relatively low, the required drive force for driving the manual operation member is relatively small. Contrary to this, when the vehicle speed becomes relatively high, the required drive force for driving the manual operation member becomes large. Furthermore, as shown in FIG. 3B, the counterforce applied to the manual operation member can be gradually increased in a proportional manner according to the vehicle speed. In this case, when the vehicle speed is relatively low, the required drive force for driving the manual operation member is relatively small. When the vehicle speed is gradually increased, the required drive force for driving the manual operation member is gradually increased in a proportional manner.

Figure 4A:
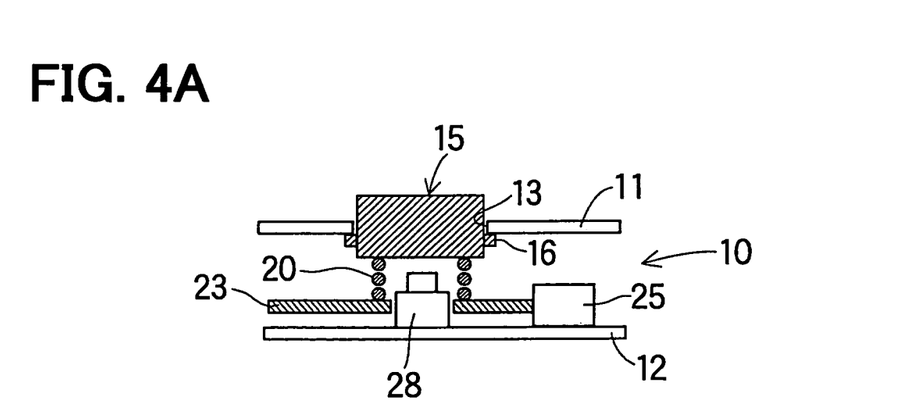
FIG. 4A is a cross sectional view of a manual operation device according to a first embodiment of the present invention, showing one operational state of the manual operation device.
Figure 4B:
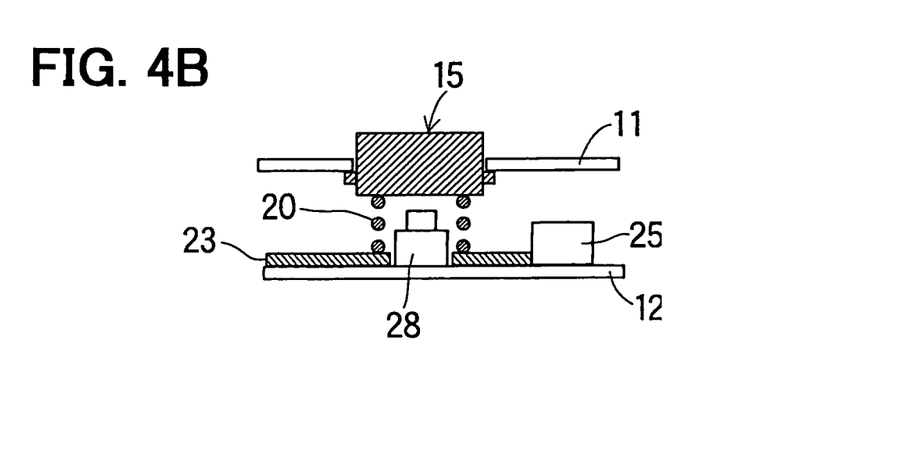
FIG. 4B is a cross sectional view similar to FIG. 4A, showing another operational state of the manual operation device.

FIGS. 4A and 4B show a first embodiment of the present invention. A manual operation device of the first embodiment includes a housing 10, an operation button 15, a compression spring (counterforce applying means) 20, a liftable plate (movable member) 23, a motor 25 and a contact 28. The liftable plate 23 and the motor 25 constitute the counterforce changing means.

The housing 10 includes an upper housing part (first housing part) 11 and a lower housing part (second housing part) 12, which are spaced away from each other in a vertical direction in FIGS. 4A and 4B. The operation button 15 is received in a receiving hole 13 formed in the upper housing part 11 and is depressable in a downward direction in FIGS. 4A and 4B. The contact 28, which is arranged below the operation button 15 in FIGS. 4A and 4B, is turned on by the operation button 15 to output a drive signal for driving the in-vehicle apparatus (e.g., the audio apparatus) when the operation button 15 is pressed against the contact 28.

The operation button 15 is urged in an upward direction in FIGS. 4A and 4B by the compression spring 20, which is arranged between a lower surface of the operation button 15 and an upper surface of the liftable plate 23. An annular protrusion 16 is formed along an outer peripheral surface of the lower end of the operation button 15. The annular protrusion 16 is engaged with a lower surface of the upper housing part 11. A signal, which is relevant to the vehicle speed, is supplied from the vehicle speed sensor (serving as the load sensing means) E (FIG. 1) to the motor 25. Based on the signal, the motor is rotated forward or backward. When the motor 25 is rotated forward, the liftable plate 23 is driven by the motor 25, for example, through gears in the downward direction in FIGS. 4A and 4B. Thus, the liftable plate 23 is engaged with the lower housing part 12 to release or alleviate the compression of the compression spring 20. When the motor 25 is rotated backward, the liftable plate 23 is driven by the motor 25 in the upward direction in FIGS. 4A and 4B. Thus, the liftable plate 23 is moved in the upward direction in FIGS. 4A and 4B to move apart from the lower housing part 12 and thereby to compress the compression spring 20.

When the vehicle is in the parked state, the motor 25 is rotated forward based on the corresponding signal, which is supplied from the vehicle speed sensor E and is indicative of the zero speed. Thus, the liftable plate 23 is moved in the downward direction. In this state, the compression spring 20 is not largely compressed, i.e., the amount of compression of the compression spring 20 is relatively small. Thus, an urging force (counterforce) applied to the operation button 15 in the upward direction becomes relatively small. In the parked state of the vehicle, the driver can concentrate on the operation of the operation button 15. Thus, the driver can comfortably operate the operation button 15 with a relatively small drive force. In the parked state of the vehicle, the operational feeling of the driver in the operation of the operation button 15 can be improved when the counterforce applied from the operation button 15 to the hand of the driver is relatively small at the time of depressing the operation button 15 to operate the audio apparatus.

In the driving state of the vehicle, a predetermined vehicle speed signal is supplied from the vehicle speed sensor E to the motor 25, so that the motor 25 is rotated backward to move the liftable plate 23 in the upward direction in FIGS. 4A and 4B. Thus, the compression spring 20 is substantially compressed. As a result, a relatively large urging force is applied from the compression spring 20 to the operation button 15 in the upward direction. Therefore, the drive force required to depress the operation button 15 is increased.

Thus, at the time of operating the audio apparatus, the driver is required to depress the operation button 15 with the relatively large force, which can overcome the urging force of the compression spring 20. In the driving state of the vehicle, the driver mainly concentrate on the maneuvering of the vehicle, so that it is difficult to appropriately depress the operation button 15 with a relatively small drive force. In the driving state of the vehicle, the better operational feeling of the driver in the operation of the operation button 15 can be achieved when the driver applies the relatively large drive force, which can overcome the large counterforce applied from the operation button 15 to the hand of the driver, to the operation button 15. This prevents inadvertent incorrect operation of the operation button 15 caused by excessive depressing of the operation button 15.

FIGS. 5–8 show a second embodiment of the present invention. In this embodiment, one of the navigation apparatus, the air conditioning apparatus and the audio apparatus can be selected by rotating a single rotatable operation knob 40. Regardless of the type of the selected apparatus, the counterforce applied from the operation knob 40 to the hand of the driver, i.e., the drive force required to drive the operation knob 40 in operation of the operation knob 40 differs between the parked state of the vehicle and the driving state of the vehicle.

Figure 5:
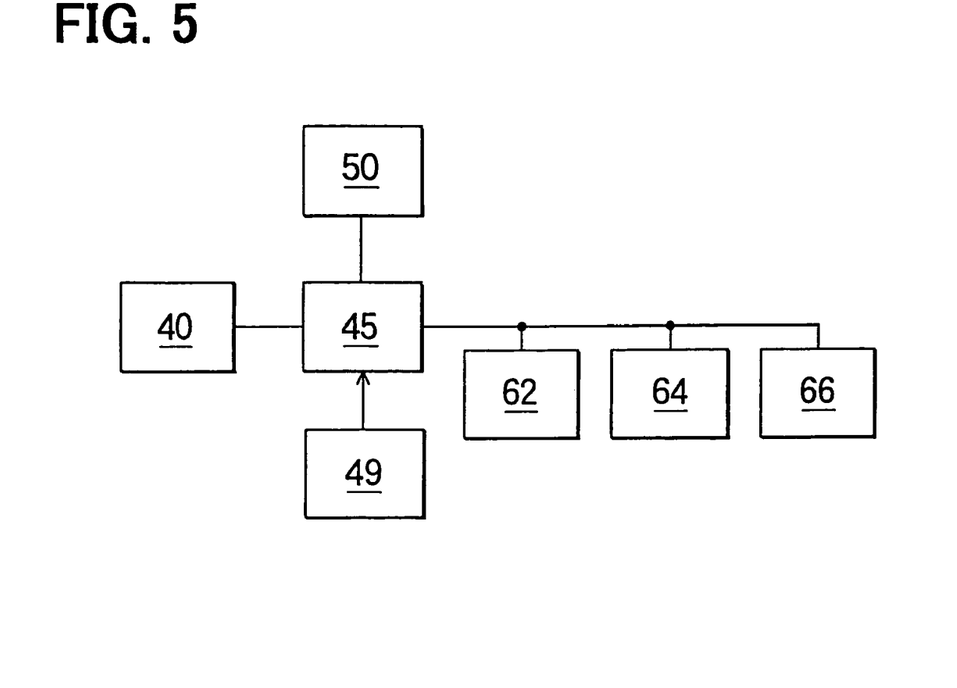
FIG. 5 is a schematic view showing a manual operation device according to a second embodiment of the present invention.

Specifically, as shown in FIG. 5, the operation knob (manual operation member) 40, a motor (counterforce applying means and counterforce changing means) 45, a load sensor 49, a display device 50, a navigation apparatus 62, an air conditioning apparatus 64 and an audio apparatus 66 are provided.

Figure 6:
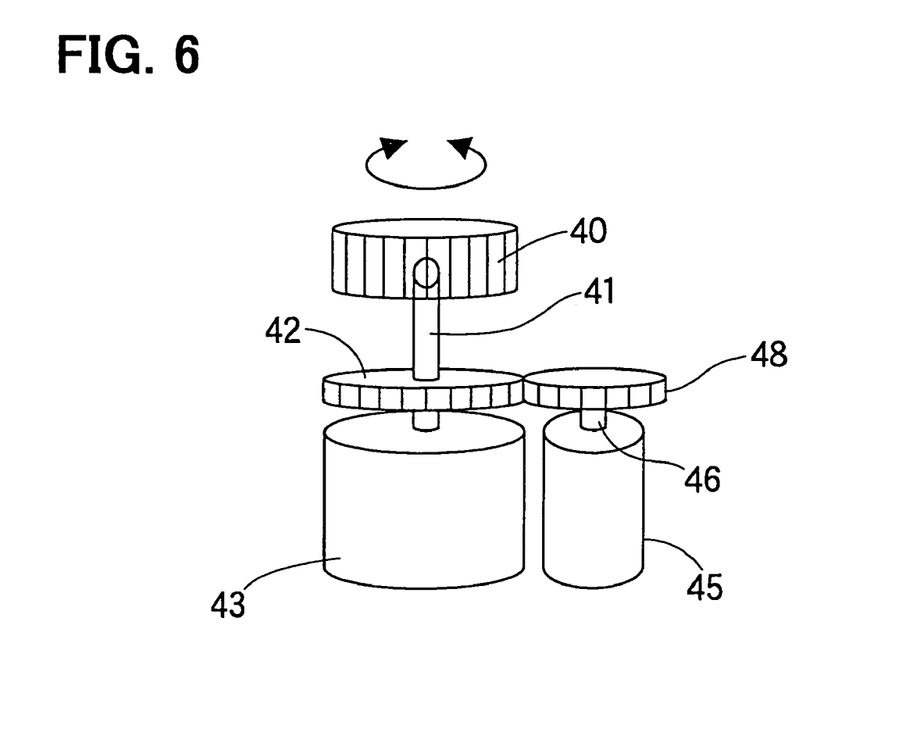
FIG. 6 is a partial schematic side view showing the manual operation device of the second embodiment.

As shown in FIG. 6, a first gear 42 is connected to a rotatable shaft 41 of the operation knob 40. A rotary encoder 43 is connected to an end of the rotatable shaft 41. The rotary encoder 43 senses the amount of rotation of the operation knob 40. A second gear 48 is connected to an output shaft 46 of the motor 45, which is arranged next to the rotary encoder 43. Furthermore, the second gear 48 is meshed with the first gear 42. A sensed result of the load sensor 49 is inputted to the motor 45.

Figure 7:
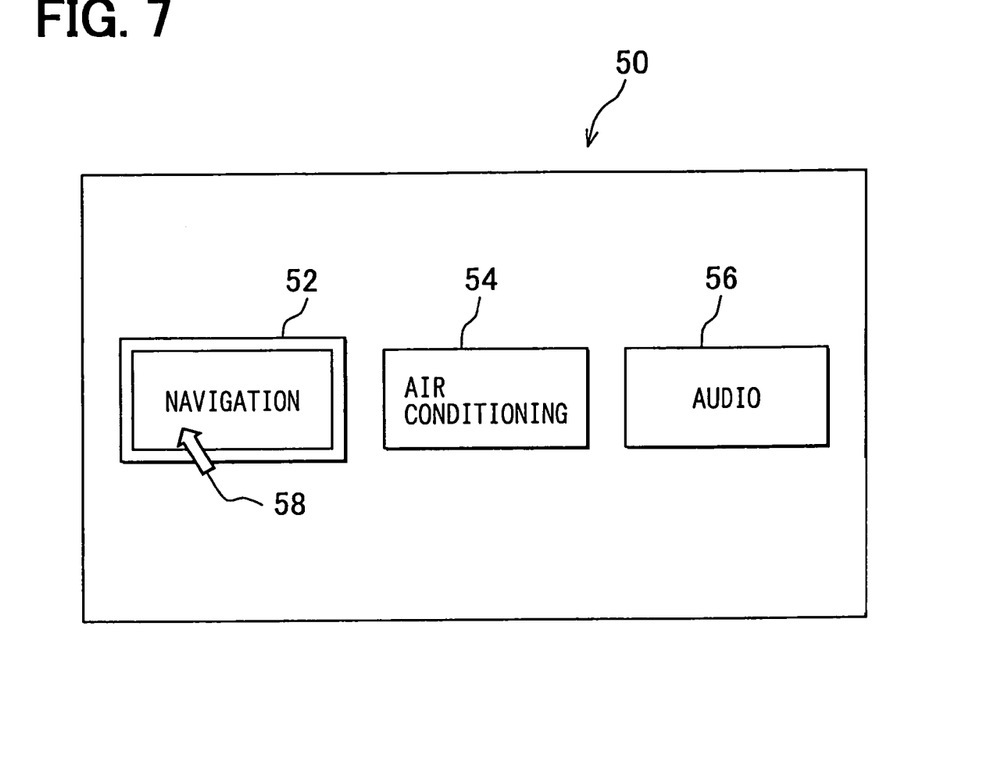
FIG. 7 is a frontal view showing a display device of the manual operation device of the second embodiment.

With reference to FIG. 7, the display device 50 includes a navigation mark 52, an air conditioning mark 54 and an audio mark 56. The subject in-vehicle apparatus, which is selected through rotation of the operation knob 40, is indicated by a cursor 58. In the case of FIG. 7, the navigation apparatus 62 is selected as the subject in-vehicle apparatus.

According to the sensed result of the load sensor 49, the drive force of the motor 45 is conducted to the operation knob 40 through the gears 48, 42 to provide the counterforce to the hand of the driver. As indicated by a line X in FIG. 8, when the vehicle is in the parked state, the motor 45 generates a relatively small counterforce against the operational movement of the operation knob 40. Contrary to this, as indicated by a line Y in FIG. 8, when the vehicle is in the driving state, the motor 45 generates a relatively large counterforce against the operational movement of the operation knob 40. Furthermore, when one of the navigation apparatus 62, the air conditioning apparatus 64 and the audio apparatus 66 is selected in the parked state of the vehicle, the counterforce indicated by the line X is relatively small (see portions x1, x2 and x3 of the line X in FIG. 8). Also, in the parked state of the vehicle, at the time of switching between the navigation apparatus 62 and the air conditioning apparatus 64 and the time of switching between the air conditioning apparatus 64 and the audio apparatus 66, the counterforce becomes relatively large (see portions x4 and x5 of the line X in FIG. 8).

Figure 8:
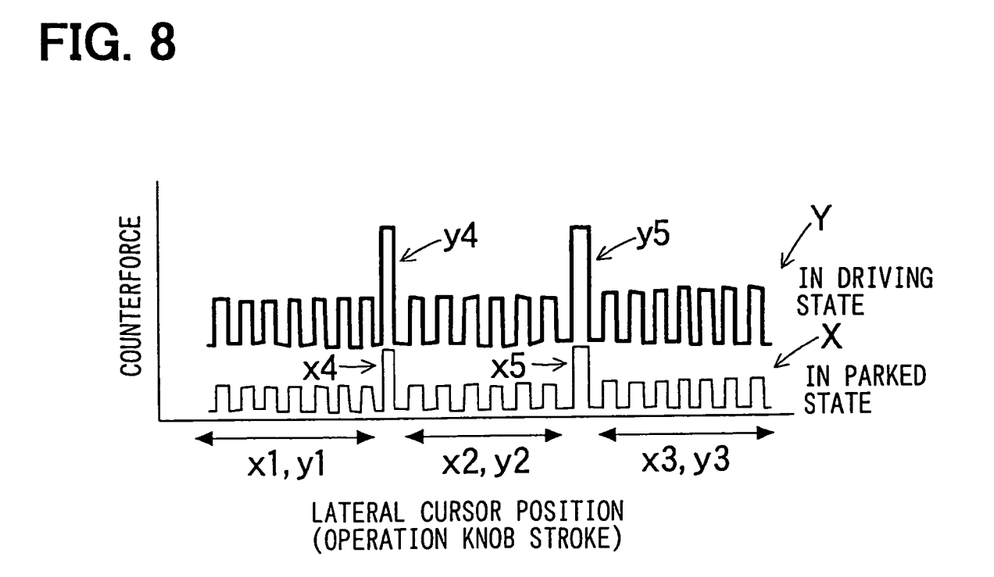
FIG. 8 is a graph showing a relationship between the amount of counterforce and the stroke of an operation knob in each of a parked state of a vehicle and a driving state of the vehicle according to the second embodiment.

The same principle is applied in the driving state of the vehicle, as depicted by portions y1, y2 and y3 of the line Y and portions y4 and y5 of the line Y in FIG. 8.

In the second embodiment, when one of the navigation apparatus 62, the air conditioning apparatus 64 and the audio apparatus 66 is selected, the amount of counterforce acting against the operational movement of the operation knob 40, i.e., the drive force required to move the operation knob 40 is relatively small in the parked state of the vehicle, in which the driver experiences only a little operational work load, and is relatively large in the driving state of the vehicle, in which the driver experiences a relatively large operational work load. Thus, in the parked state of the vehicle, the driver can concentrate on the operation of the operation knob 40 and thus can operate the operation knob 40 with a relatively small drive force. Contrary to this, in the driving state of the vehicle, the driver mainly concentrates on the maneuvering of the vehicle and operates the operation knob 40 with a relatively large drive force, thereby limiting occurrence of inadvertent incorrect operation of the operation knob 40.

Furthermore, regardless of whether the vehicle is in the parked state or in the driving state, the counterforce applied against the operational movement of the operation knob 40 becomes large at the time of switching between the navigation apparatus 62 and the air conditioning apparatus 64 as well as at the time of switching between the air conditioning apparatus 64 and the audio apparatus 66. In this way, the driver can feel the switching between the in-vehicle apparatuses through his/her hand without visually checking the display device 50. This allows an increase in driving safety.

FIGS. 9A to 10B show a third embodiment of the present invention. In this embodiment, a depressable operation button provides click feeling at the time of operating (depressing) the operation button, and the operational work load of the driver is classified into two classes.

Figure 9A:
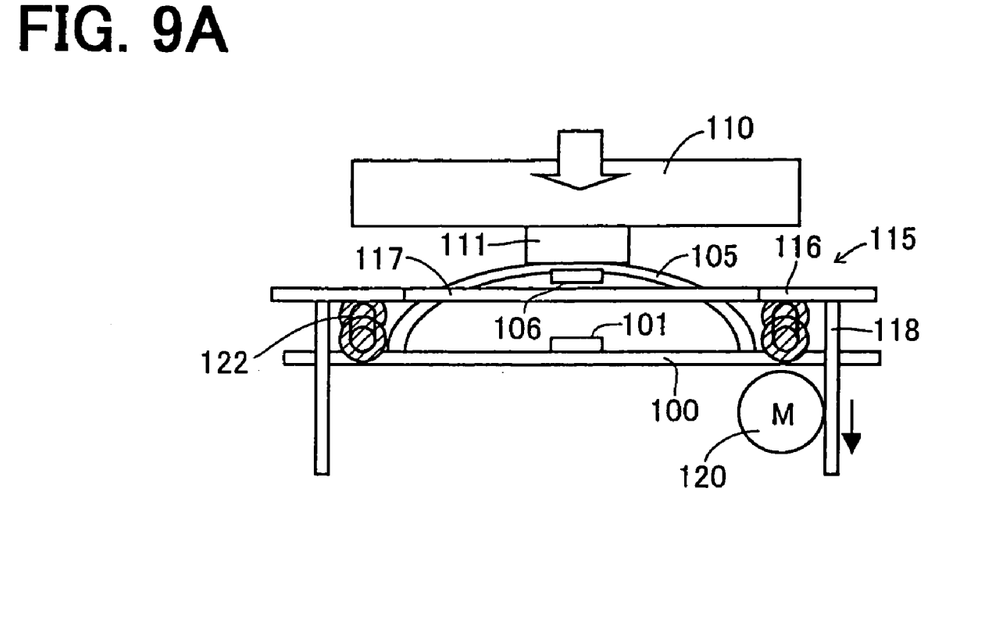
FIG. 9A is a schematic cross sectional view of a manual operation device according to a third embodiment of the present invention in one operational state.

Specifically, with reference to FIG. 9A, a push switch (or button) 110 for operating the cruise control apparatus is installed to an upper surface of a base plate 100 through a dome member 105. The dome member 105 is made of a resilient material, such as rubber. An opening part of the dome member 105 is tightly connected to the base plate 100 while the opening part of the dome member 105 faces the base plate 100. A first switch piece 101 is secured to the upper surface of the base plate 100, and a second switch piece 106 is secured to an inner lower surface of a top portion of the dome member 105 in such a manner that the switch pieces 101, 106 are opposed to one another. A projection 111 is formed in a lower surface of the push switch 110 and is engageable with an outer upper surface of the top portion of the dome member 105.

A movable member (counterforce changing means) 115 includes a horizontal portion (first portion) 116 and a vertical portion (second portion that extends generally perpendicular to the first portion) 118 and is movable relative to the base plate 100 in a vertical direction, as indicated by a bold arrow in FIG. 9A. The vertical portion 118 extends through the base plate 100 in a thickness direction of the base plate 100 (i.e., a direction perpendicular to a plane of the base plate 100) and is movable in the vertical direction while being guided by the base plate 100. An opening 117 is formed in a center of the horizontal portion 116 such that the opening 117 allows penetration of the dome member 105 and the projection 111 through the opening 117. The movable member 115 is driven by a motor 120 to move in an upward direction or a downward direction in FIG. 9A. A driving direction of the movable member 115 driven by the motor 120 and a stroke (the amount of displacement) of the movable member 115 driven by the motor 120 are determined based on the operational work load of the driver. A compression spring (coil spring) 122 is arranged between a peripheral edge of the horizontal portion 116 and the base plate 100 and urges the movable member 115 away from the base plate 100 in the upward direction in FIG. 9A. The compression spring serves as the counterforce applying means.

For illustrative purposes, it will be assumed that the push switch 110 is depressed while the vehicle is traveling in a low to middle speed range. At this time, as shown in FIG. 9A, the movable member 115 is driven by the motor 120 and is thus placed in a lower position, and the horizontal portion 116 is spaced away from the push switch 110 in the downward direction. In this state, when the push switch 110 is operated, i.e., is depressed, the dome member 105 is deformed. As indicated by a line k in FIG. 9B, the top portion of the dome member 105 is progressively deformed in the downward direction in FIG. 9A until the stroke (the amount of depression) of the push switch 110 and the required drive force required to drive the push switch 110 reach about 0.7 mm and 0.9 N, respectively. Also during this period, the required drive force required to drive the push switch 110 is generally proportional to the stroke of the push switch 110.

Figure 9B:
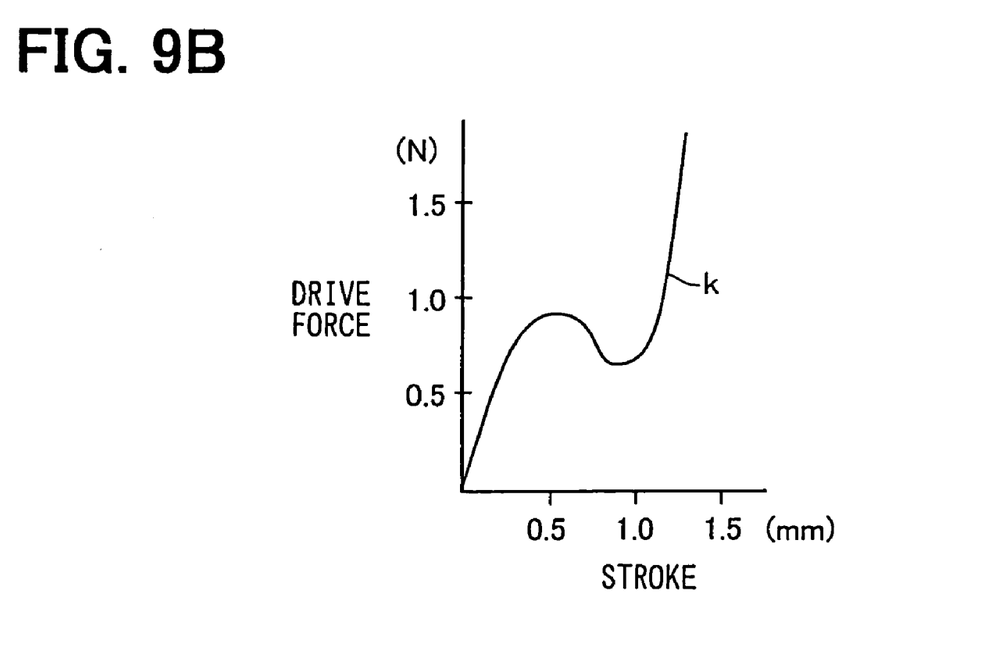
FIG. 9B is a graph showing a relationship between the amount of drive force and a stroke of a push button of the manual operation device of the third embodiment.

When the stroke of the push switch 110 exceeds 0.7 mm, a radially intermediate part of the dome member 105 is largely deformed, i.e., is buckled in the downward direction, and the second switch piece 106 contacts the first switch piece 101. Thus, the cruise control apparatus is turned on, i.e., is operated. At this time, the required drive force is rapidly reduced to provide click feeling to the driver. Because of this click feeling, the driver can sense the turning on of the push switch 110 through his/her hand.

Figure 10A:
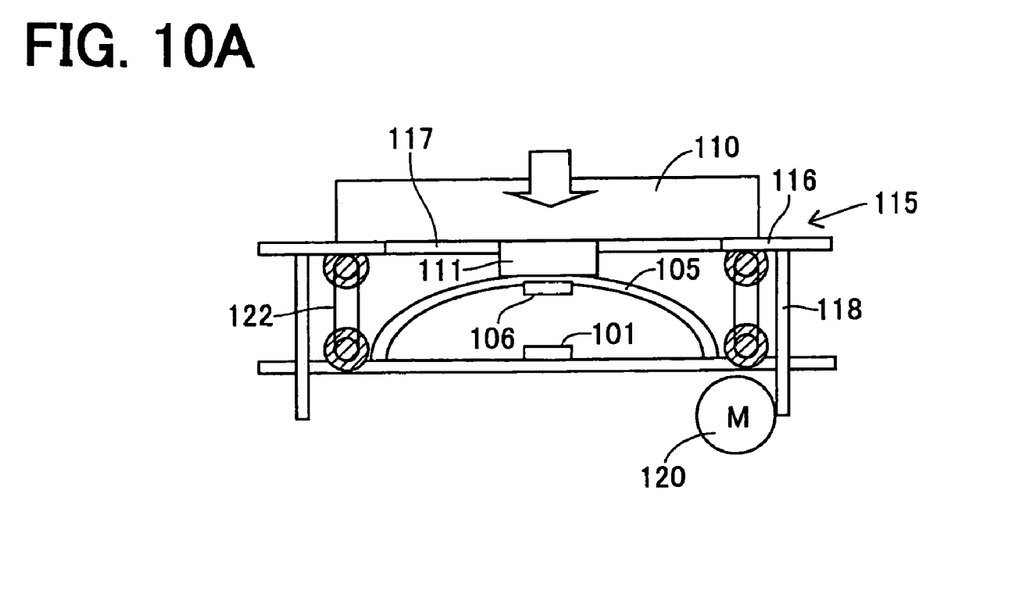
FIG. 10A is a cross sectional view of the manual operation device of the third embodiment similar to FIG. 9A, showing another operational state of the manual operation device.

Next, it will be assumed that the push switch 110 is depressed while the vehicle is traveling at a high speed. In this case, as shown in FIG. 10A, the movable member 115 is driven by the motor 120 and is thus moved in the upward direction in FIG. 10A, and an extent of the compression spring 122 in the vertical direction in FIG. 10A is lengthened in comparison to that of FIG. 9A, so that an upper surface of the horizontal portion 116 contacts the lower surface of the push switch 110. In this state, upward resilient force of the dome member 105 and upward spring force of the compression spring 112 are applied to the push switch 110. Thus, the driver depresses the push switch 110 with a force that overcomes a sum (corresponding to a line m in FIG. 10B) of the upward resilient force of the dome member 105 (corresponding to a line k in FIG. 10B) and the upward spring force of the compression spring 122 (corresponding to a line l in FIG. 10B). In this case, even when the stroke of the push switch 110 reaches about 0.7 mm, the dome member 105 is not buckled, i.e., the push switch 110 is not turned on until the drive force for driving the push switch 110 exceeds beyond about 1.7 N. In this way, inadvertent incorrect operation of the push switch 110 can be prevented even when the vehicle is traveling at the high speed where the driver is mainly concentrated on the maneuvering of the vehicle.

Figure 10B:
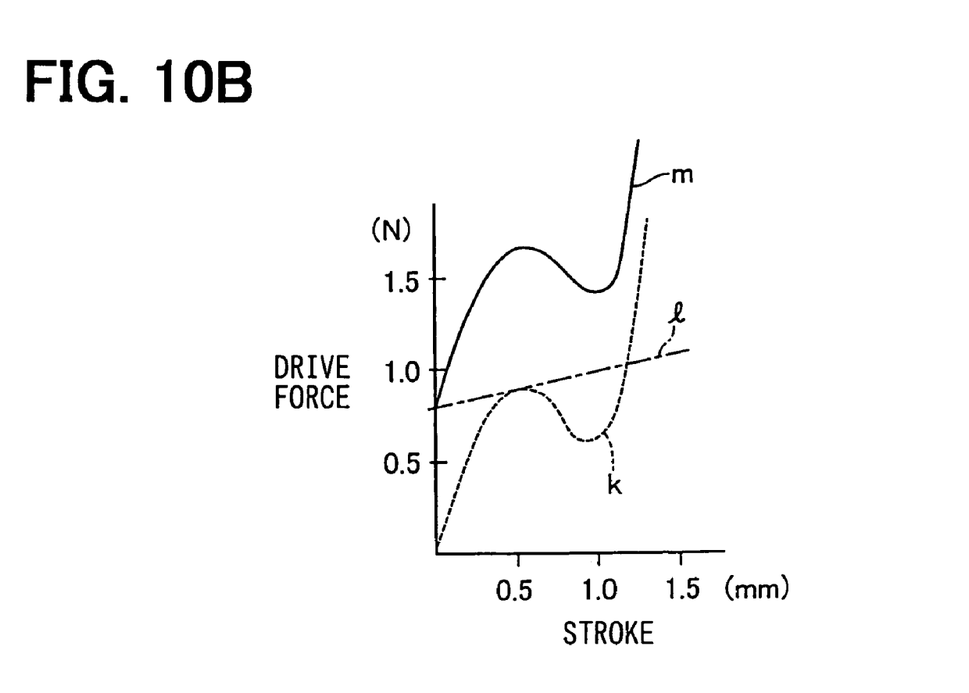
FIG. 10B is a graph showing a relationship between the amount of drive force and a stroke of a push button of the manual operation device of the third embodiment.

Furthermore, even in the case where the vehicle is traveling at the middle speed, when the stroke of the push switch 110 exceeds 0.7 mm, the radially intermediate part of the dome member 105 is rapidly buckled in the downward direction, so that the driver can sense the turning on of the push switch 110.

Figure 11A:
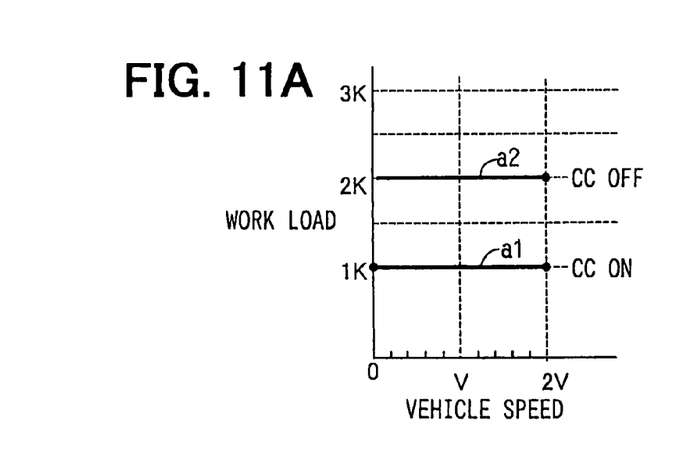
FIG. 11A is a graph illustrating evaluation of the operational work load of the driver of the vehicle through use of a combination of the vehicle speed and an operational state of a cruise control apparatus installed in the vehicle.

Next, a specific example of evaluation of the operational work load of the driver will be described with reference to FIGS. 11A–11D. In the case of FIG. 11A, the operational work load of the driver is evaluated, i.e., is determined through use of a combination of the vehicle speed (i.e., in the parked state or the driving state) and the operational state (i.e., on-state or off-state) of the cruise control apparatus. As indicated by a straight line a1 in FIG. 11A, in the case where the cruise control apparatus is turned on, when the vehicle is parked or is traveling at a speed equal to or less than a predetermined speed 2v, the operational work load of the driver is set to 1K. Contrary to this, as indicated by a straight line a2 in FIG. 11A, in the state where the cruise control apparatus is turned off, when the vehicle speed is equal to or less than the predetermined speed 2v, the operational work load of the driver is set to 2K.

Figure 11B:
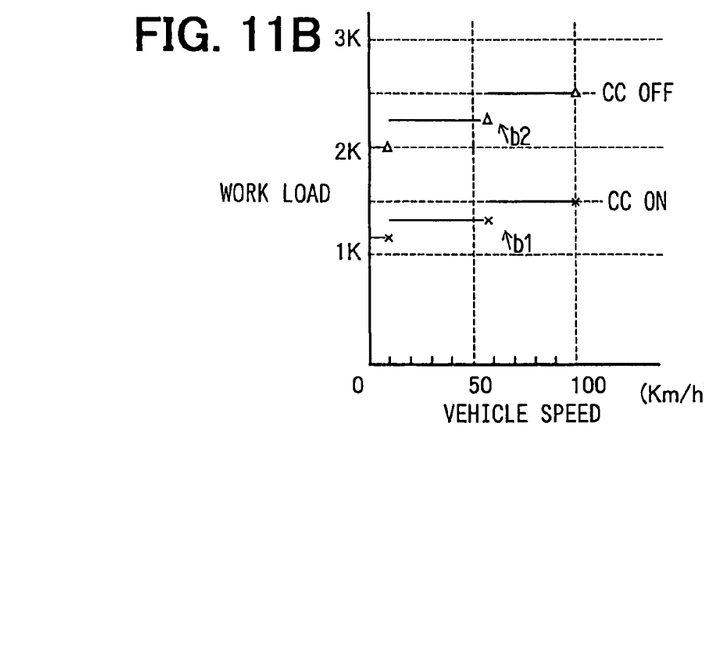
FIG. 11B is a graph illustrating evaluation of the operational work load of the driver through use of a combination of the vehicle speed and the operational state of the cruise control apparatus.

In the case of FIG. 11B, the operational work load of the driver is evaluated through use of a combination of the vehicle speed (classified into three classes, i.e., 10 km or less, 10–60 km and greater than 60 km) and the operational state (i.e., on-state or off-state) of the cruise control apparatus. With reference to a group b1 of three straight lines indicated in FIG. 11B, the operational work load of the driver will be described in the case where the cruise control apparatus is turned on. In the on-state of the cruise control apparatus, when the vehicle speed is 10 km or less, the operational work load of the driver is set to 1.2K. In the on-state of the cruise control apparatus, when the vehicle speed is 10–60 km, the operational work load of the driver is set to 1.35K. In the on-state of the cruise control apparatus, when the vehicle speed is greater than 60 km, the operational work load of the driver is set to 1.5K.

With reference to a group b2 of three straight lines in FIG. 11B, the operational work load of the driver will be described in the case where the cruise control apparatus is turned off. In the off-state of the cruise control apparatus, when the vehicle speed is equal to or less than 10 km, the operational work load of the driver is set to 2K. In the off-state of the cruise control apparatus, when the vehicle speed is 10–60 km, the operational work load of the driver is set to 2.25K. In the off-state of the cruise control apparatus, when the vehicle speed is greater than 60 km, the operational work load of the driver is set to 2.5K.

Figure 11C:
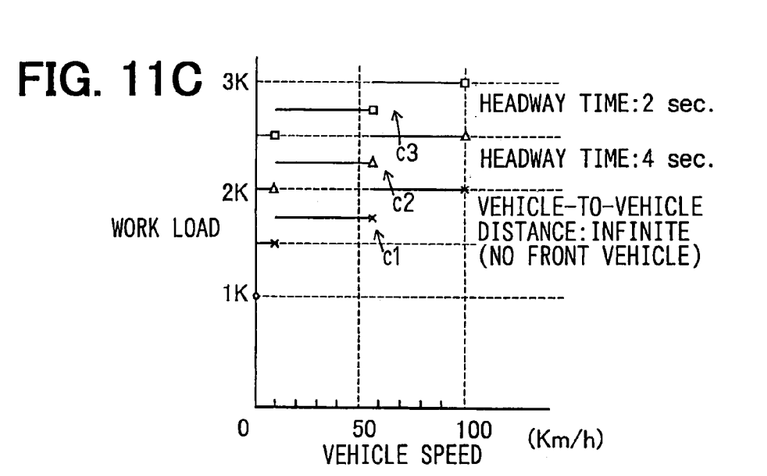
FIG. 11C is a graph illustrating evaluation of the operational work load of the driver through use of a combination of the vehicle speed and the vehicle-to-vehicle distance.

In the case of FIG. 11C, the operational work load of the driver is evaluated through use of a combination of the vehicle speed and the vehicle-to-vehicle distance (headway time). With reference to a group c1 of three straight lines in FIG. 11C, the operational work load of the driver will be described in the case where no front vehicle is present in front of the subject vehicle. In the case of absence of the front vehicle, when the vehicle speed is equal to or less than 10 km, the operational work load of the driver is set to 1.5K. In the case of absence of the front vehicle, when the vehicle speed is 10–60 km, the operational work load of the driver is set to 1.75K. In the case of absence of the front vehicle, when the vehicle speed is greater than 60 km, the operational work load of the driver is set to 2K.

With reference to a group c2 of three straight lines in FIG. 11C, the operational work load of the driver will be described in the case where the headway time between the subject vehicle and the vehicle immediately in front of the subject vehicle is 4 seconds. In the case of the headway time of 4 seconds, when the vehicle speed is equal to or less than 10 km, the operational work load of the driver is set to 2K. In the case of the headway time of 4 seconds, when the vehicle speed is 10–60 km, the operational work load of the driver is set to 2.25K. In the case of the headway time of 4 seconds, when the vehicle speed is greater than 60 km, the operational work load of the driver is set to 2.5K. Next, With reference to a group c3 of three straight lines in FIG. 11C, the operational work load of the driver will be described in the case where the headway time between the subject vehicle and the vehicle immediately in front of the subject vehicle is 2 seconds. In the case of the headway time of 2 seconds, when the vehicle speed is equal to or less than 10 km, the operational work load of the driver is set to 2.5K. In the case of the headway time of 2 seconds, when the vehicle speed is 10–60 km, the operational work load of the driver is set to 2.75K. In the case of the headway time of 2 seconds, when the vehicle speed is greater than 60 km, the operational work load of the driver is set to 3K.

Figure 11D:
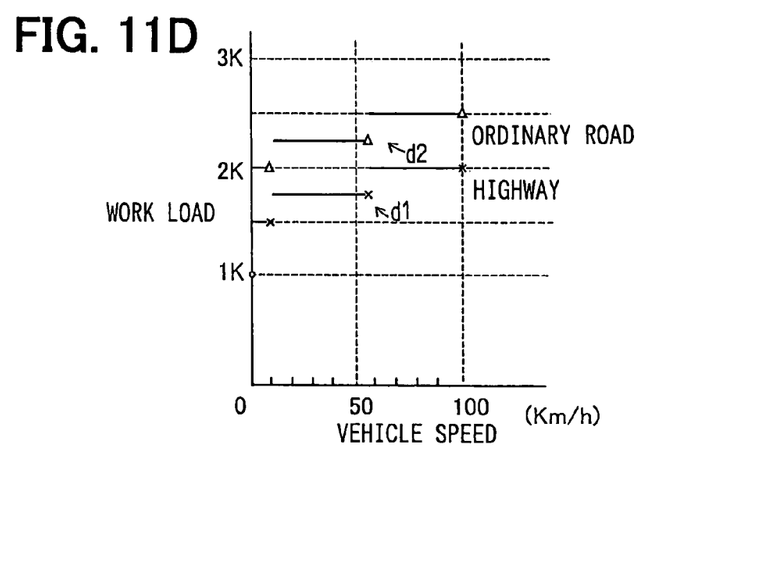
FIG. 11D is a graph illustrating evaluation of the operational work load of the driver through use of a combination of the vehicle speed and a type of a subject road.

In the case of FIG.11D, the operational work load of the driver is evaluated through use of a combination of the vehicle speed and a type of a subject road where the subject vehicle travels. With reference to a group d1 of three straight lines in FIG.11D, the operational work load of the driver will be described in the case where the vehicle is traveling a highway (motor road). In the case of traveling the highway, when the vehicle speed is equal to or less than 10 km, the operational work load of the driver is set to 1.5K. In the case of traveling the highway, when the vehicle speed is 10–60 km, the operational work load of the driver is set to 1.75K. In the case of traveling the highway, when the vehicle speed is greater than 60 km, the operational work load of the driver is set to 2K. Next, with reference to a group d2 of three straight lines in FIG. 11D, the operational work load of the driver will be described in the case where the vehicle is traveling an ordinary road, such as a city street, which is not considered as the motor road. In the case of traveling the ordinary road, when the vehicle speed is equal to or less than 10 km, the operational work load of the driver is set to 2K. In the case of traveling the ordinary road, when the vehicle speed is 10–60 km, the operational work load of the driver is set to 2.25K. In the case of traveling the ordinary road, when the vehicle speed is greater than 60 km, the operational work load of the driver is set to 2.5K.

It should be noted that any two or more of the cases depicted in FIGS. 11A–11D can be combined, if desired. For example, if the case of the FIG. 11B and the case of FIG. 11C are combined, the operational work load of the driver will be evaluated through use of the vehicle speed (classified into three classes, i.e., 10 km or less, 10–60 km and greater than 60 km), the operational state (on/off state) of the cruise control apparatus and the headway time.

Additional advantages and modifications will readily occur to those skilled in the art. The invention in its broader terms is therefore not limited to the specific details, representative apparatus, and illustrative examples shown and described.

What is claimed is:

1. A manual operation device for operating at least one in-vehicle apparatus installed in a vehicle, the manual operation device comprising:
   an operation member that is manually operable in at least one predetermined direction to select and drive at least one of the at least one in-vehicle apparatus;
   a counterforce applying means for applying counterforce to the operation member against operational movement of the operation member;
   a load sensing means for sensing an operational work load of a person operating the vehicle; and
   a counterforce changing means for changing the counterforce based on the operational work load of the person operating the vehicle sensed by the load sensing means; wherein
   the at least one in-vehicle apparatus is selected from a group of an air conditioning apparatus, an audio apparatus, a cruise control apparatus and a navigation apparatus.

2. The manual operation device according to claim 1, wherein:
   the operational work load of the person operating the vehicle sensed by the load sensing means is expressed in terms of at least one of a vehicle speed, a vehicle-to-vehicle distance, an on/off state of the cruise control apparatus and a type of a subject road where the vehicle is traveling.

3. The manual operation device according to claim 2, wherein;
   the load sensing means determines that the operational work load of the person operating the vehicle is relatively small when at least one of the following conditions is satisfied:
   the vehicle speed is relatively slow;
   the vehicle-to-vehicle distance is relatively large;
   the cruise control apparatus is in an on-state; and
   the type of the subject road is a motor road; and
   the load sensing means determines that the operational work load of the person operating the vehicle is relatively large when at least one of the following conditions is satisfied:
   the vehicle speed is relatively high;
   the vehicle-to-vehicle distance is relatively small;

the cruise control apparatus is in an off-state; and
the type of the subject road is not a motor road.

4. The manual operation device according to claim 1, wherein:
when the operational work load of the person operating the vehicle is relatively small, the counterforce changing means makes the counterforce relatively small to make a required drive force for driving the operation member relatively small; and
when the operational work load of the person operating the vehicle is increased, the counterforce changing means increases the counterforce in a stepwise manner or in a proportional manner to increase the required drive force for driving the operation member in a stepwise manner or in a proportional manner.

5. The manual operation device according to claim 1, wherein:
the operation member is a depressable button, which is depressed in a depressing direction to operate one of the at least one in-vehicle apparatus;
the counterforce applying means is a compression spring, which urges the depressable button in a direction opposite from the depressing direction of the depressable button; and
the counterforce changing means is a movable member that is moved to change an extent of the compression spring.

6. The manual operation device according to claim 5, wherein the depressable button provides click feeling when the depressable button is depressed.

7. The manual operation device according to claim 1, wherein:
the at least one in-vehicle apparatus includes a plurality of in-vehicle apparatuses;
the operation member is a rotatable knob, which is rotated in an operating direction to selectively operate at least one of the in-vehicle apparatuses; and
the counterforce applying means and the counterforce changing means is integrated in a form of a motor, which provides a variable urging force to the rotatable knob in a direction opposite from the operating direction of the rotatable knob.

8. The manual operation device according to claim 7, wherein the rotatable knob provides click feeling at each switching position, at which the rotatable knob switches operation from a corresponding one of the in-vehicle apparatuses to a next one of the in-vehicle apparatuses.

9. The manual operation device according to claim 1, wherein the operational work load of the person operating the vehicle sensed by the load sensing means is expressed in terms of at least one of a vehicle speed, a vehicle-to-vehicle distance and a type of a subject road where the vehicle is traveling.

10. The manual operation device according to claim 9, wherein:
the load sensing means determines that the operational work load of the person operating the vehicle is relatively small when at least one of the following conditions is satisfied:
the vehicle speed is relatively slow;
the vehicle-to-vehicle distance is relatively large; and
the type of the subject road is a motor road; and
the load sensing means determines that the operational work load of the person operating the vehicle is relatively large when at least one of the following conditions is satisfied:
the vehicle speed is relatively high;
the vehicle-to-vehicle distance is relatively small; and
the type of the subject road is not a motor road.

11. A manual operation device for operating at least one in-vehicle apparatus installed in a vehicle, the manual operation device comprising:
an operation member that is manually operable in at least one predetermined direction to select and drive at least one of the at least one in-vehicle apparatus:
a counterforce applying means for applying counterforce to the operation member against operational movement of the operation member;
a load sensing means for sensing an operational work load of a person operating the vehicle; and
a counterforce changing means for changing the counterforce based on the operational work load of the person operating the vehicle sensed by the load sensing means; wherein
the load sensing means includes a vehicle speed sensor that senses a vehicle speed of the vehicle; and
when it is determined that the vehicle speed sensed through the vehicle speed sensor is zero, the counterforce changing means sets the counterforce to a first value that is smaller than a second value that is set in a state where the vehicle speed sensed through the vehicle speed sensor is other than zero.

* * * * *